Sept. 7, 1948.  J. B. BLACK ET AL  2,448,855
AERODYNAMIC BRAKE AND HOIST COMBINATION
Filed May 16, 1944  4 Sheets-Sheet 1

Inventors:
James B. Black
Wilbur F. Shurts
By: John W. Darley
Attorney

Sept. 7, 1948.　　　　J. B. BLACK ET AL　　　　2,448,855
AERODYNAMIC BRAKE AND HOIST COMBINATION
Filed May 16, 1944　　　　　　　　　　　　　　4 Sheets-Sheet 2
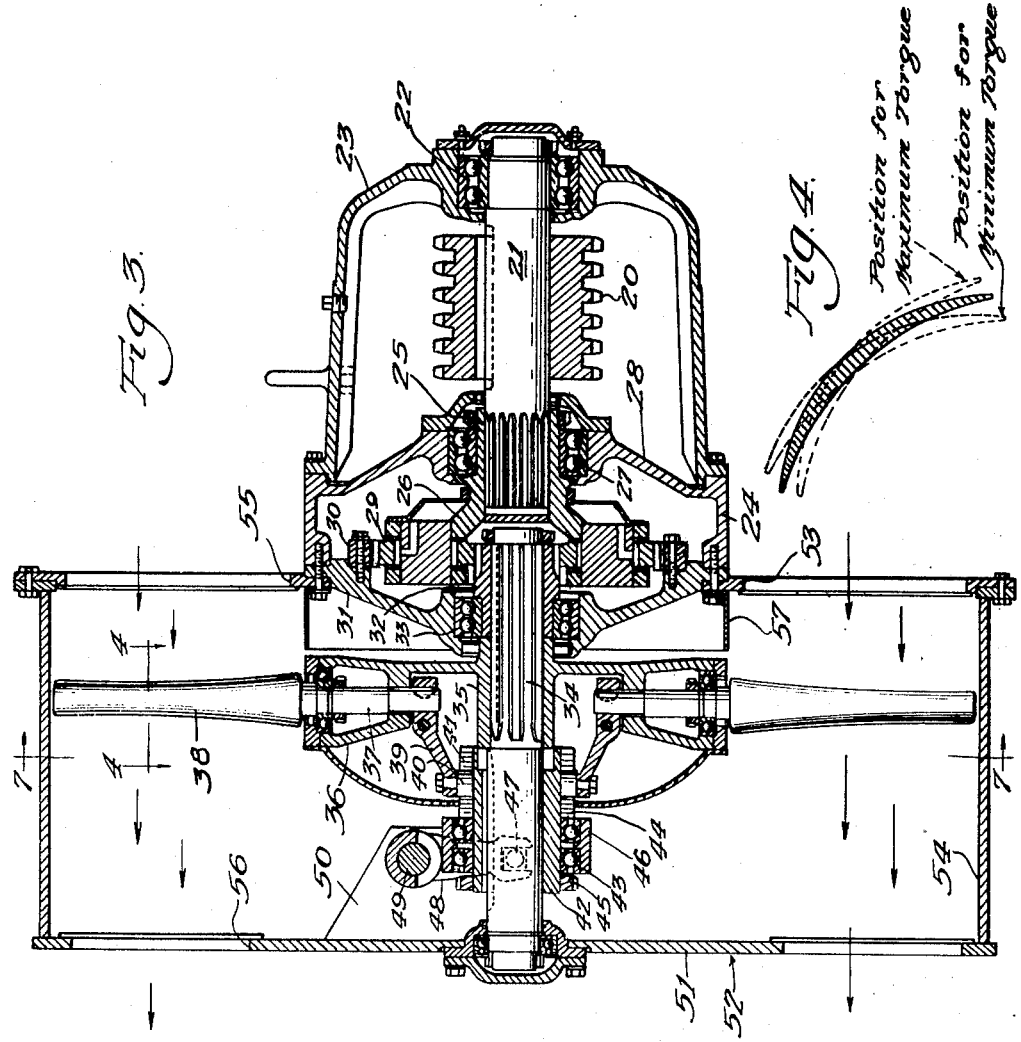
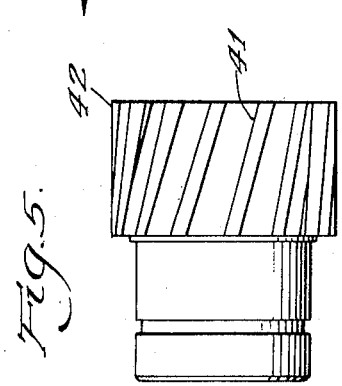
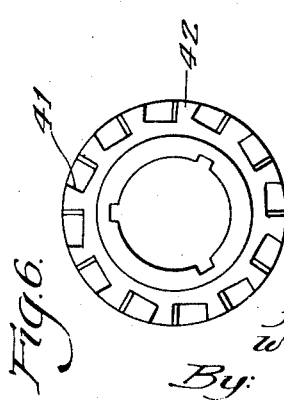
Inventors:
James B. Black
Wilbur F. Shurts
By
John W. Darley
Attorney Sept. 7, 1948.  J. B. BLACK ET AL  2,448,855
AERODYNAMIC BRAKE AND HOIST COMBINATION
Filed May 16, 1944  4 Sheets-Sheet 3
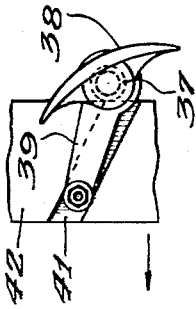
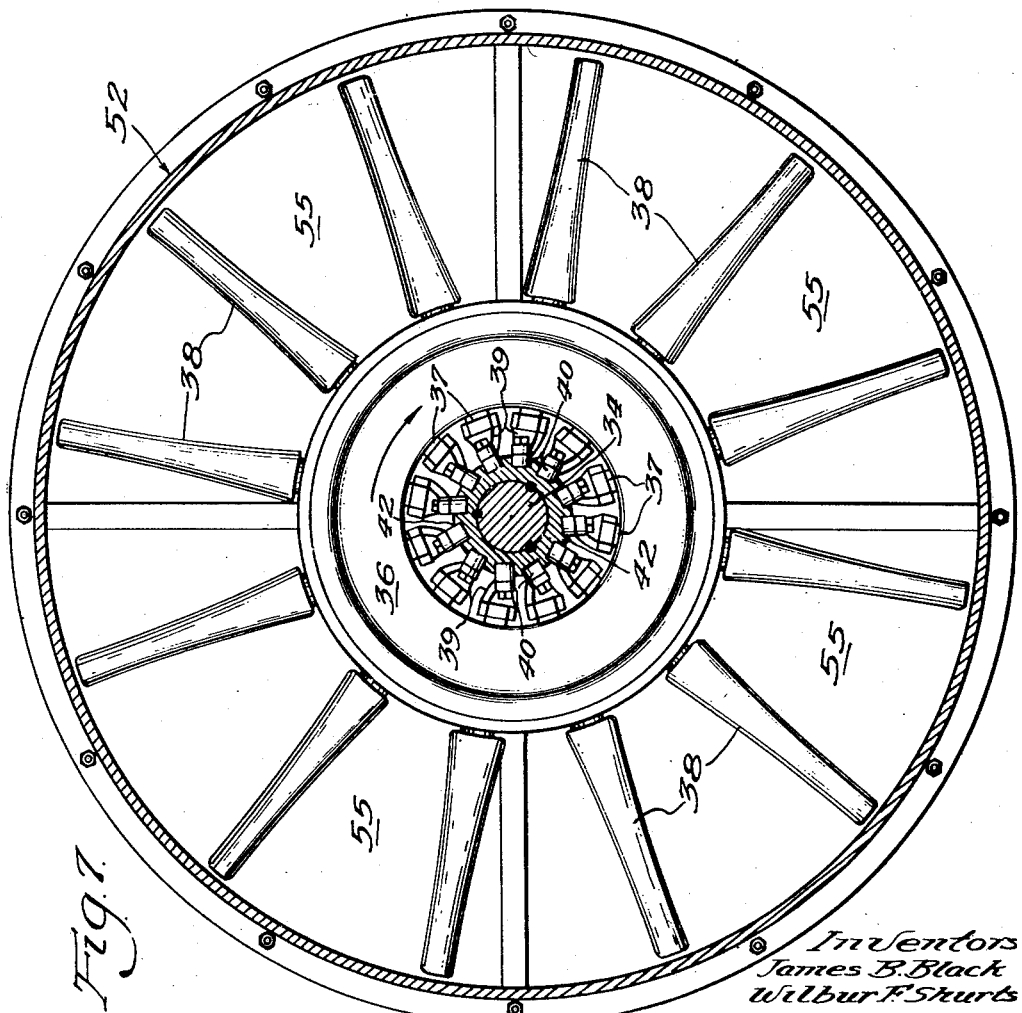

Sept. 7, 1948.  J. B. BLACK ET AL  2,448,855
AERODYNAMIC BRAKE AND HOIST COMBINATION
Filed May 16, 1944  4 Sheets-Sheet 4
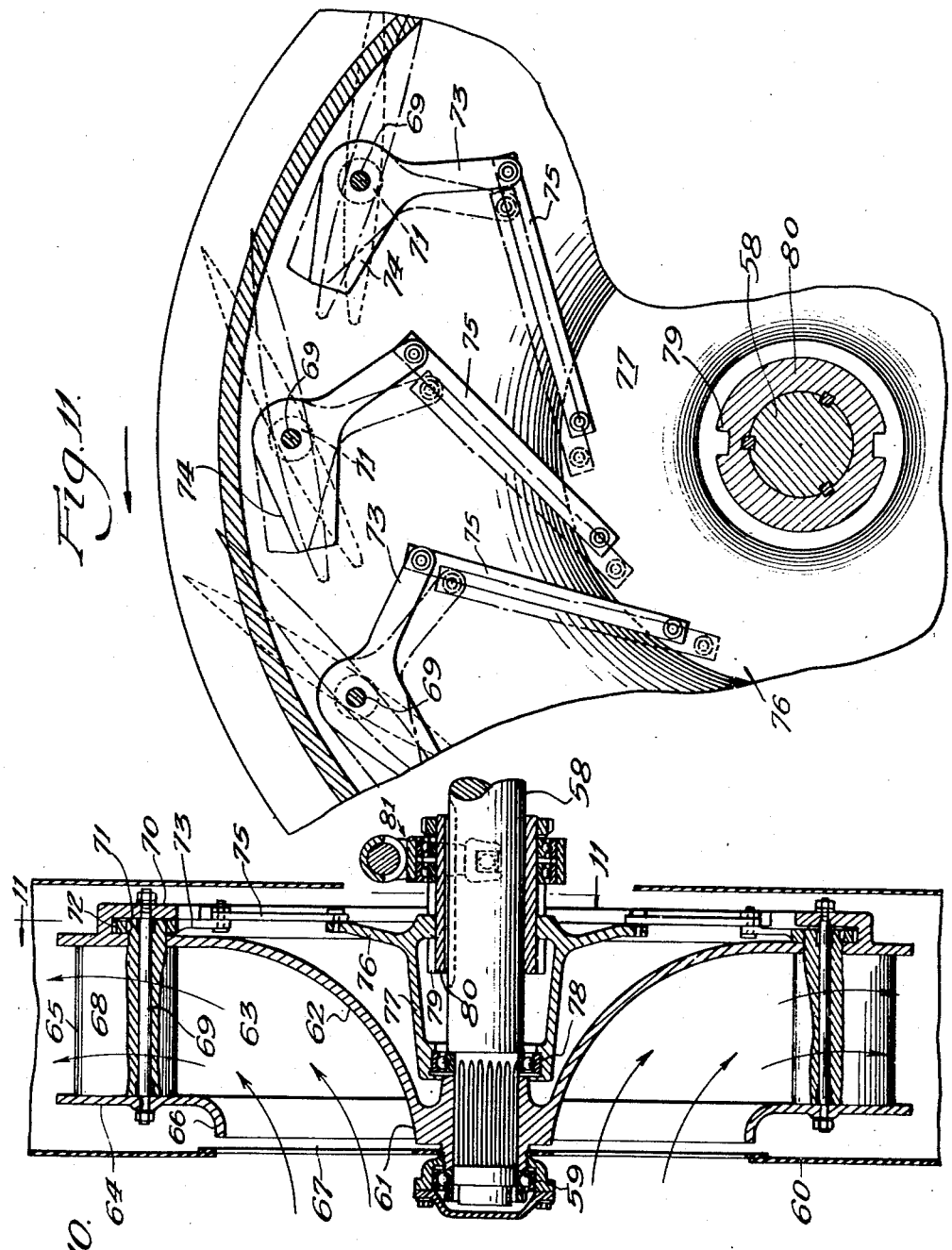
Inventors:
James B. Black
Wilbur F. Shurts
By: John W. Darley
Attorney Patented Sept. 7, 1948

2,448,855

UNITED STATES PATENT OFFICE 2,448,855

AERODYNAMIC BRAKE AND HOIST COMBINATION

James B. Black and Wilbur F. Shurts, Rockford, Ill., assignors to Twin Disc Clutch Company, Racine, Wis., a corporation of Wisconsin Application May 16, 1944, Serial No. 535,838

2 Claims. (Cl. 254—187)

Our invention relates to brakes for adjustably and automatically controlling the speed of a descending load, as in oil well rigs and comparable hoists, and is more particularly concerned with providing an aerodynamic brake in which braking resistance is developed by the operation of an air fan coupled to the load.

By way of example, the invention will be described in connection with oil well drilling equipment, although in its generic aspects, it is applicable to any type of hoist and is characteristically employable under conditions in which the load is dropped at high speeds for several thousand feet. In the drilling of an oil well, the initial load may comprise sections of well casing, drilling tools of various types, or apparatus for bailing the well, and to these items must be added, as a constant load increment, the weight of the descending cable.

Previous methods for controlling the descending speed of such loads have included the use of mechanical friction brakes, or the so-called hydrodynamic brakes. The space available and the necessity for portability in equipment of this nature imposes a size limitation on the friction brake which renders it unsuitable for deep drilling operations, i. e., five thousand feet or more, since the brake must be applied continuously during descent of the load and the ensuing wear and heat, in the size of brake that can be employed, results in excessive maintenance and repair costs. On the other hand, the hydrodynamic brake, while satisfactory for deep drilling, has developed its own problems. These brakes take the form of a hydraulic coupling in which one bladed member is held stationary and the other bladed member is mounted for rotation and is connected to the load, so that the brake operates as a hydraulic coupling with 100% slip and the energy created by the descending load is absorbed by liquid friction within the brake.

This friction develops heat and it is therefore necessary to connect a cooling system to the brake for dissipating the heat, unless the working liquid is wasted which is ordinarily impracticable, and to provide a separate pump for circulating the liquid through the cooling system or to incorporate a pumping device with the brake rotor. Moreover, where a clutch is not interposed between the brake and the cable reel, the brake imposes a drag on the hoisting motor or engine during raising of the load. Finally, the use of liquid as the braking medium necessitates the use of carefully designed and expensive packing to prevent leakage. These objections are reflected in a relatively high initial cost of the unit, additional repair parts, and the requirement for space to accommodate the cooling system.

It is therefore the principal object of our invention to provide a brake system for controlling the speed of a descending load in which braking resistance is secured aerodynamically by the pumping action of an air fan that is rotated by the moving load.

A further object is to devise an aerodynamic brake of the character indicated wherein torque control of the brake is effected by regulating the volume of air delivered by the fan through an adjustment of the positions of the fan blades.

A further object is the utilization of either a propeller or a centrifugal fan as the air pumping member of the brake which is geared to the load to insure a fan speed sufficient to absorb the horsepower developed by the load.

A further object is to provide a fan brake system wherein the braking resistance may be increased as the weight of the load increases during lowering to achieve a substantially constant speed of the load regardless of the distance through which it is lowered.

These and further objects of our invention will be set forth in the following specification, reference being had to the accompanying drawings, and the novel means by which said objects are effectuated will be definitely pointed out in the claims.

In the drawings:

Fig. 3 is an enlarged, sectional elevation of the brake, as viewed in Fig. 1, the fan blades being feathered to positions intermediate of those for exerting maximum and minimum resistance to the rotation of the winding drum.

Fig. 4 is an enlarged section along the line 4—4 in Fig. 3 showing a suggested blade curvature and in dotted outline the maximum and minimum torque positions occupied by a blade.

Figs. 5 and 6 are side and end elevations, respectively, of the cam for adjusting the blade positions.

Fig. 7 is a section along the line 7—7 in Fig. 3.

Figs. 8 and 9 are schematic views showing the relation of one blade to the regulating cam in a pumping and a substantially non-pumping position, respectively.

Fig. 10 is a sectional elevation of a centrifugal type of fan having blades adjustable to vary the volume output of air.

Fig. 11 is a fragmentary section along the line 11—11 in Fig. 10 showing blade relations in two positions thereof.

Figure 1:
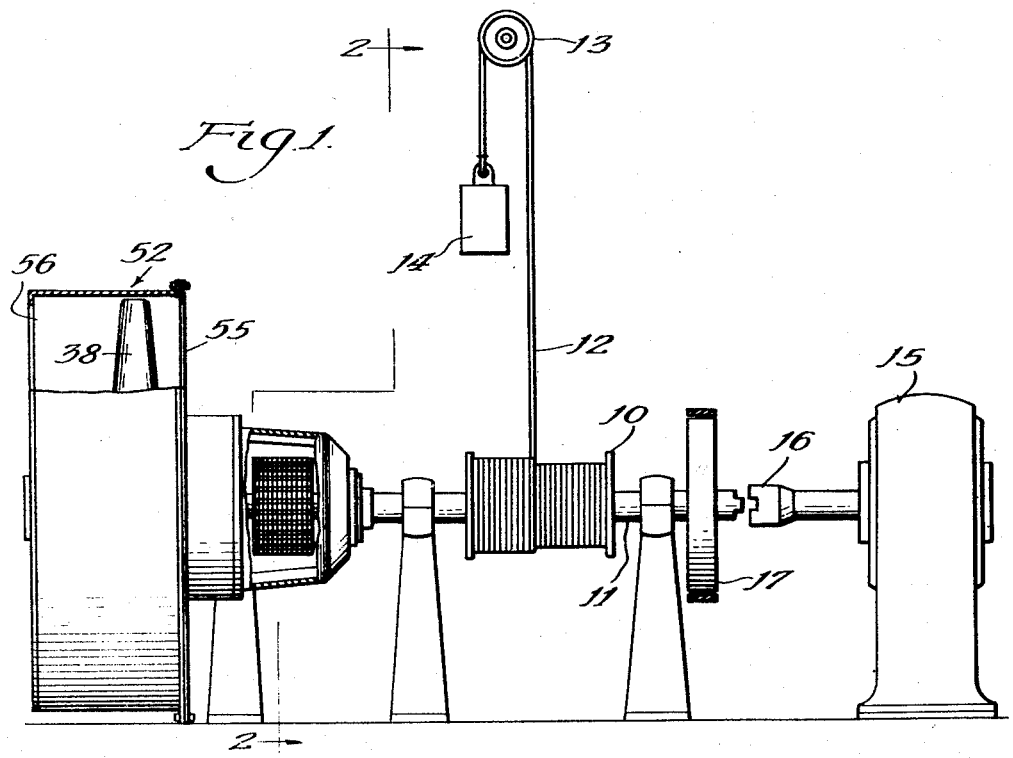
Fig. 1 is a diagrammatic view of a typical hoist rig equipped with one form of our improved aerodynamic brake which incorporates a controllable pitch, propeller fan.
Figure 2:
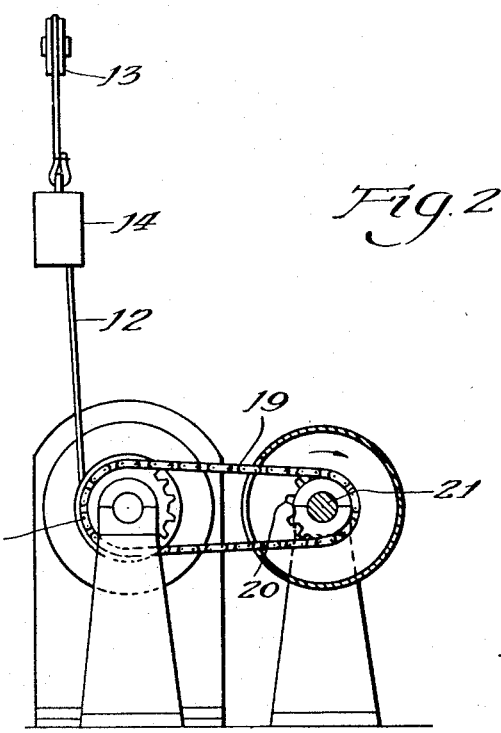
Fig. 2 is a section along the line 2—2 in Fig. 1.

Referring to Figs. 1 and 2, the numeral 10 designates a winding drum or reel that is mounted on a shaft 11 and around which is wound a cable 12 that operates over a pulley 13 and is connected to a suspended load 14. This arrangement provides a means for raising or lowering the load and is intended to be generically representative of any rig for accomplishing these results. The load may be raised by a motor or prime mover 15 that may be coupled to one end of the shaft 11 by a clutch 16 and may be held in any raised or lowered position by means of a friction brake 17 operably related to the shaft 11. To lower the load, the clutch 16 is disconnected and the load then falls under the action of gravity. It is desirable to control the speed of the descending load and this result is automatically attained by absorbing through the operation of the aerodynamic brake the power generated by the falling load. Generally speaking, the speed of the load increases until the energy absorbed by the brake equals the kinetic energy developed by the load and thereafter acceleration of the load ceases and it falls at a constant speed. In this connection, our improved brake is characterized by a notable advantage, particularly with respect to the hydrodynamic brake, in that through an adjustment of the fan blade positions, it is able to control the maximum speed of the load. When the load has dropped the desired distance, it is brought to rest and held by the friction brake 17, an operation that can be effected within a few turns of the drum 10 and with a minimum of wear of the brake 17 since the latter need only overcome the inertia of the load 14 plus the inertia represented by the weight of the suspended cable 12.

To accomplish the foregoing control, the end of the shaft 11 opposite to the clutch 16 has secured thereto a sprocket 18 which is connected by a chain 19 with a sprocket 20 keyed to an offset shaft 21 (see Figs. 1, 2 and 3) that constitutes the driving shaft of the aerodynamic brake, more particularly illustrated in Fig. 3. The outer end of the shaft 21 is journaled in a bearing 22 carried by a casing 23 that partially encloses the sprocket 20 and is bolted to a gear housing 24. The inner end of the shaft 21 is splined for driving connection with a sleeve 25 forming part of a planet pinion carrier 26 and the sleeve is journaled in a bearing 27 supported in an angular wall 28 of the housing 24. Rotatably mounted in and around the carrier 26 is a plurality of planet pinions 29, each of which meshes with a fixed, internal ring gear 30 that is bolted to an annular wall 31 of the gear housing 24 and with a sun gear 32 that is journaled in a bearing 33 carried by the wall 31.

The sun gear 32 is splined to a fan shaft 34 and this gear and the coacting pinions 29 and ring gear 30 constitute a compact, planetary gear train for increasing the speed of the shaft 34 in relation to the shaft 21 and insuring that the fan driven by the shaft 34 will operate at a speed sufficient to exercise the desired torque control on the shaft 21 and hence on the winding drum 10.

Also splined to the shaft 34 is a fan hub 35 having circumferentially spaced therearound a plurality of blade hubs 36, each of which has journaled therein a spindle 37 which is connected to a blade 38, the fan and blade hubs 35 and 36, respectively, and the blades 38 together forming a propellor fan. For convenience, and as indicated in Fig. 4, the blades are illustrated as being curved, but the shape of the blades is a matter of choice and in cross-section they may be flat or of the air foil type. Twelve blades are shown, but the number employed is also a matter of selection.

An important feature of the invention consists in the adjustment of the blades to vary their pitch and hence the extent of torque control on the shaft 21 between a position in which substantially no control is exercised, as when the motor 15 is raising the load 14 and it is desired to have a minimum of drag on the motor, and a position of maximum control. For this purpose, the inner end of each spindle 37 extends beyond the inner end of the associated hub 36 and has secured thereto one end of an arm 39 whose opposite end carries a roller 40 that operates in a cam slot 41 of which there is a plurality circumferentially spaced around one end of a sleeve 42 that is keyed to and slidable endwise on the shaft 34. As indicated in Fig. 5, the slots 41 are angularly disposed to the axis of the sleeve 42 so that when the latter is moved towards the right from the position shown in Figs. 3 and 8 to that illustrated in Fig. 9, the blades 38 are rotated clockwise as indicated in the last noted figure and in Fig. 4 to a position of minimum torque control and when the sleeve 42 is moved in the opposite direction, the blades are shifted to maximum torque control positions, as shown in Fig. 4.

In order to shift the sleeve 42, the left end thereof, as viewed in Fig. 3, carries the inner races of a pair of ball bearings 43 which are clamped against a shoulder 44 on the sleeve by means of a nut 45. The outer races of the bearings 43 are encircled by a trunnion ring 46 that is held against axial movement relative to the bearings and is provided with a pair of trunnion pins 47, only one of which is shown in Fig. 3. These pins are engaged in the characteristic clutch shifter fashion by a yoke 48 that is rockable by a shaft 49 journaled in a bracket 50 carried by a rear wall 51 forming part of a fan housing 52. It will be understood that the shaft 49 extends without the housing for attachment to an actuating handle (not shown). One end of the shaft 34 is journaled in the wall 51 and the planetary gear housing is secured to a front wall 53 of the fan housing, the walls 51 and 53 being connected by a lateral wall 54 and the fan housing being supported by a suitable base (not shown). An annular, inlet opening 55 for the air is provided in the wall 53 and a similarly shaped outlet opening 56 in the wall 51. Preferably, an annular shield 57 extends between the inner edge of the opening 55 to adjacent the roots of the blades 38 as a guiding element for the entering air.

As indicated in Fig. 3, the fan is of the high speed, axial flow type in which the hub diameter is large in relation to the diameter of the blades. High efficiency is obtained by making the area of the air inlet 55 larger than that of the outlet 56, thereby providing a Venturi-like effect in the fan housing. This construction accelerates the velocity of air through the fan, reduces slip and establishes a favorable lift-drag ratio.

Under operating conditions, when the motor 15 is raising the load 14, the clutch 16 being engaged, the blades 38 occupy the positions shown in Fig. 9, i. e., a non-pumping position, in order to eliminate drag on the motor, this position being the same as the minimum control position shown in Fig. 4.

When it is desired to drop the load, the clutch 16 is disengaged, and the load then falls under the action of gravity. The speed of the load is controlled by braking the rotation of the drum 10 through the action of the fan, or, in other words, the power generated by the falling load is absorbed or expended by the pumping action of the fan. Since the horsepower absorbed by the fan at any given speed depends generally upon the volume of air pumped, it will be obvious that torque control on the drum can be effectively exercised by varying through the cam 42 the blade angle of the fan blades as the load falls. For any given blade angle, the load will eventually attain a constant speed and this speed, which is the maximum speed for the particular blade angle, can be varied by changing the angle as desired. Due to this capacity for varying the torque resistance, it is possible, despite the fact that the total weight being lowered constantly increases owing to the lengthening of the suspending cable, to maintain an approximately constant speed of the load, regardless of the depth to which it may be dropped.

During the braking action, the fan rotates clockwise, as viewed in Fig. 7, and the air moves from right to left through the fan housing 52, as viewed in Fig. 3. The energy is converted to friction and all energy is dissipated by friction, the larger portion being absorbed externally of the fan by the impact of the fan blast on the surrounding atmosphere. Some heat may be generated in the fan and the fan housing due to friction and the usual fan losses, but the rise in temperature never becomes critical and does not affect the primary braking function of the fan. Different operating requirements can be satisfactorily met by varying the number and shape of the blades and the control of their pitch.

In Figs. 10 and 11 is illustrated a centrifugal type of fan which can be substituted as a braking factor for the propeller fan in the hoist rig illustrated in Fig. 1 and which also incorporates blades adjustable to vary the volume output of air. In the former figures, the numeral 58 designates a fan shaft whose right end may be supported and gear connected to the driving shaft 21 in the manner illustrated in Fig. 3, while the left end is journaled in a bearing 59 that may be supported in any approved manner, as by the fan housing 60.

A fan hub 61 is spline connected to the shaft 58 and has integrally formed therewith a frusto-conical member 62 which defines one wall of the air duct 63 through the fan and constitutes a part of the fan frame. The other wall is defined by an annular plate 64 which is axially spaced from the radial part of the member 62 to form the radial portion 65 of the air duct 63 and includes a coaxial flange 66 that defines with the adjacent portion of the member 62 the annular, inlet opening 67 of the fan.

Extending between the plate 64 and the radial portion of the member 62 is a plurality of blades 68 circumferentially spaced around the fan frame and each blade is rockable on a pin 69 bridged between the plate 64 and a guide lip 70 that is offset externally from the radial part of the member 62. The blade 68 includes a hub 71 that extends within the annular groove 72 partly formed by the lip 70 and an actuating arm 73 embraces the hub. The arm 73 is provided with a counterbalance wing 74 that operates in the groove 72 and the arm is pivotally connected to one end of a link 75 whose opposite end is pivotally connected to an annular flange 76 forming part of a hub 77 that is common to the actuating mechanism for all of the blades. Hence, by rotating the hub 77, it is possible to vary the blade positions and therefore the volume output of the fan. The wing 74 is proportioned to counterbalance the air pressure on the associated blade and the centrifugal force of this blade in order to secure the easiest possible shifting effort.

For this purpose, one end of the hub 77 is journaled on a bearing 78 carried by the shaft 58 and the opposite end has toothed, sliding connection with grooves 79 provided in a cam sleeve 80 that is keyed to the shaft 58 and arranged for relative axial movement. The sleeve 80 is the counterpart of the sleeve 42 in the propeller fan assembly and its grooves 79 are spiraled on the surface of the sleeve so that when the sleeve is moved towards the right, for example, as viewed in Fig. 9, the blades will be shifted from the dotted to the dot-dash positions shown in Fig. 11. The sleeve 80 may be moved by a trunnion ring-yoke mechanism designated generally by the numeral 81 in Fig. 9, corresponding generally to the similar arrangement illustrated in Fig. 3.

The operating characteristics of the centrifugal fan and its manner of use are similar to those heretofore described in connection with the propeller fans. When the load is raised by the motor 15, the fan blades would occupy the dot-dash positions shown in Fig. 11 in which the air volume output would be substantially negligible since the discharge areas between the blades is decreased and the motor would therefore be subjected to minimum drag. During the time when the load is dropping, its speed may be controlled up to a maximum by appropriately positioning the blades 68, as hereinbefore described. As the blades are rotated counter-clockwise from the positions shown by dot and dash lines in Fig. 11, the discharge areas between the blades are increased, resulting in an increase in the air output and therefore an increase in the horsepower absorption by the fan which is reflected in a braking action on the drum 10.

Since most of the energy absorption is dissipated directly in the atmosphere with either of the above types, cooling does not present a problem. It is unnecessary to provide extraneous cooling equipment as in those kinds of apparatus which employ a liquid as the braking medium. Moreover, by controlling the pitch or blade angle of the fan blades, the use of a clutch between the lifting motor and the fan to obviate drag on the former is eliminated.

We claim:

1. In a hoist system, the combination of a winding drum connected to a suspended load, power means for rotating the drum in a winding direction to raise the load, a clutch for connecting the means to the drum, and an air fan connected to the drum and having blades shiftable between positions exercising a substantial aerodynamic resistance to the unwinding of the drum under the action of gravity when the clutch is disconnected and a negligible resistance during power winding of the drum.

2. In a hoist system, the combination of a shaft rotatable in one direction by a falling load, power means for rotating the shaft in the opposite direction to raise the load, a clutch for connecting the means to the shaft, and an air fan driven by the shaft and having blades shiftable between positions exercising a substantial aerodynamic resistance to the rotation of the shaft under the impulse of the falling load when the clutch is disconnected and a negligible resistance during power rotation of the shaft, the shaft and fan being coaxially related.

JAMES B. BLACK.
WILBUR F. SHURTS.

REFERENCES CITED

The following references are of record in the file of this patent:

UNITED STATES PATENTS

| Number | Name | Date |
|---|---|---|
| 56,553 | Gullman | July 24, 1866 |
| 289,318 | Smith | Nov. 27, 1883 |
| 662,568 | Lord | Nov. 27, 1900 |
| 703,426 | Kiler | July 1, 1902 |
| 737,115 | Kiler | Aug. 25, 1903 |
| 984,050 | Uppercu | Feb. 14, 1911 |
| 1,350,018 | Gill | Aug. 17, 1920 |
| 1,951,640 | Allner | Mar. 20, 1934 |
| 2,219,215 | Anderson | Oct. 22, 1940 |
| 2,253,406 | Wagner | Aug. 19, 1941 |
| 2,361,007 | Buchanan | Oct. 24, 1944 |

FOREIGN PATENTS

| Number | Country | Date |
|---|---|---|
| 185,139 | Great Britain | Aug. 24, 1922 |
| 218,859 | Great Britain | July 17, 1924 |